(12) United States Patent
    Hahn

(10) Patent No.: US 11,032,867 B2
(45) Date of Patent: Jun. 8, 2021

(54) METHOD AND APPARATUS FOR PERFORMING COMMUNICATION USING AGGREGATED CARRIERS IN V2X COMMUNICATION SYSTEM

(71) Applicants: Hyundai Motor Company, Seoul (KR); Kia Motors Corporation, Seoul (KR)

(72) Inventor: Gene Beck Hahn, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/364,889

(22) Filed: Mar. 26, 2019

(65) Prior Publication Data
    US 2019/0306911 A1    Oct. 3, 2019

Related U.S. Application Data

(60) Provisional application No. 62/648,692, filed on Mar. 27, 2018.

(30) Foreign Application Priority Data

Mar. 11, 2019 (KR) .................. 10-2019-0027475

(51) Int. Cl.
    *H04W 76/27*    (2018.01)
    *H04W 76/14*    (2018.01)
    *H04L 5/00*     (2006.01)
    *H04W 72/04*    (2009.01)

(52) U.S. Cl.
    CPC ............. *H04W 76/27* (2018.02); *H04L 5/001* (2013.01); *H04L 5/0098* (2013.01); *H04W 72/0453* (2013.01); *H04W 76/14* (2018.02)

(58) Field of Classification Search
    CPC ........... H04W 72/048; H04W 72/0446; H04W 76/34; H04W 36/22
    See application file for complete search history.

(56) References Cited

U.S. PATENT DOCUMENTS

| 2018/0098322 A1* | 4/2018 | Yoon .................... H04W 72/042 |
| 2019/0104525 A1* | 4/2019 | Santhanam ....... H04W 28/0252 |
| 2020/0084669 A1* | 3/2020 | Belleschi .......... H04W 72/1236 |

* cited by examiner

*Primary Examiner* — Iqbal Zaidi
(74) *Attorney, Agent, or Firm* — Mintz Levin Cohn Ferris Glovsky; Peter F. Corless

(57) ABSTRACT

An operation method of a first terminal in a vehicle-to-everything (V2X) communication system may include: performing V2X communication with a second terminal based on an original semi-persistent scheduling (SPS) configuration in a first carrier; receiving sidelink control information (SCI) from the second terminal, the SCI including a changed SPS configuration to be applied to aggregated carriers including the first carrier; and performing the V2X communication with the second terminal based on the changed SPS configuration to be applied to the aggregated carriers.

20 Claims, 11 Drawing Sheets

METHOD AND APPARATUS FOR PERFORMING COMMUNICATION USING AGGREGATED CARRIERS IN V2X COMMUNICATION SYSTEM

CROSS-REFERENCE TO RELATED APPLICATION

This application claims the benefit of priority to U.S. Provisional Application No. 62/648,692, filed on Mar. 27, 2018 in the U.S. Patent and Trademark Office, and KR Application No. 10-2019-0027475 filed on Mar. 11 2019 in the Korean Intellectual Property Office (KIPO), the entire contents of which are incorporated herein by reference.

BACKGROUND

1. Technical Field

The present disclosure relates generally to vehicle-to-everything (V2X) communication, and more specifically, to a method and an apparatus for signaling a semi-persistent scheduling (SPS) configuration applied to aggregated carriers.

2. Related Art

Various systems have been developed for processing of wireless data such as the fourth-generation (4G) communication system (e.g., Long Term Evolution (LTE) communication system or LTE-Advanced (LTE-A) communication system) and the fifth-generation (5G) communication system (e.g., New Radio (NR) communication system), which uses a frequency band higher than the frequency band of the 4G communication system. The 5G communication system can support Enhanced Mobile Broadband (eMBB) communications, Ultra-Reliable and Low-Latency communications (URLLC), massive Machine Type Communications (mMTC), and the like.

The 4G communication system and 5G communication system can support Vehicle-to-Everything (V2X) communications. The V2X communications supported in a cellular communication system such as the 4G communication system, the 5G communication system, and the like may be referred to as 'Cellular-V2X (C-V2X) communications'. The V2X communications (e.g., C-V2X communications) may include Vehicle-to-Vehicle (V2V) communications, Vehicle-to-Infrastructure (V2I) communications, Vehicle-to-Pedestrian (V2P) communication, Vehicle-to-Network (V2N) communication, and the like.

In many cellular communication systems, V2X communications (e.g., C-V2X communications) may be performed based on "sidelink" communication technologies (e.g., Proximity based Services (ProSe) communication technology, Device-to-Device (D2D) communication technology, or the like). For example, sidelink channels for vehicles participating in the V2V communications can be established, and communications between the vehicles can be performed using the sidelink channels.

In cellular communication systems supporting the V2X communications (e.g., C-V2X communications), a vehicle (i.e., a communication node located in the vehicle) may use a carrier configured based on a semi-persistent scheduling (SPS) scheme to communicate with a counterpart node (e.g., a communication node located in another vehicle, a communication node located in the infrastructure, or a communication node carried by a person). However, in a case that a load of the carrier configured based on the SPS scheme increases, data of the vehicle (e.g., data having high reliability and low latency requirements, such as Decentralized Environment Notification Message (DENM), Cooperative Awareness Message (CAM), and the like) may not be successfully transmitted or received.

In order to distribute the load, V2X communication may be performed using aggregated carriers according to a carrier aggregation (CA) scheme, and an SPS configuration may be applied to the aggregated carriers. However, an original SPS configuration applied to one carrier may be different from a new SPS configuration to be applied to the aggregated carriers. Therefore, all terminals participating in the V2X communication may not know the new SPS configuration, causing the V2X communication to be performed improperly. As such, methods for signaling a new SPS configuration to be applied to the aggregated carriers will be needed.

SUMMARY

Accordingly, embodiments of the present disclosure provide a method and an apparatus for signaling a semi-persistent scheduling (SPS) configuration applied to aggregated carriers in a V2X communication system.

According to embodiments of the present disclosure, an operation method of a first terminal in a V2X communication system may include: performing V2X communication with a second terminal based on an original semi-persistent scheduling (SPS) configuration in a first carrier; receiving sidelink control information (SCI) from the second terminal, the SCI including a changed SPS configuration to be applied to aggregated carriers including the first carrier; and performing the V2X communication with the second terminal based on the changed SPS configuration to be applied to the aggregated carriers.

The changed SPS configuration may include at least one of data transmission intervals in the aggregated carriers, an offset between the data transmission intervals, and a size of data transmittable in each of the aggregated carriers.

The SCI may further include at least one index of at least one remaining carrier excluding the first carrier among the aggregated carriers.

The SCI may further include a flag indicating an application time point of the changed SPS configuration.

The operation method may further include, when data is transmitted together with the SCI in a same slot or a same subframe, and the flag included in the SCI is set to a first value, performing a reception operation for the data according to the original SPS configuration.

The operation method may further include, when data is transmitted together with the SCI in a same slot or a same subframe, and the flag included in the SCI is set to a second value, performing a reception operation for the data according to the changed SPS configuration.

The operation method may further include receiving a medium access control (MAC) control element (CE) from the second terminal, the MAC CE including deactivation-related information; and performing the V2X communication with the second terminal using at least one remaining carrier excluding one or more carriers indicated by the deactivation-related information among the aggregated carriers.

The deactivation-related information may include at least one of a deactivation indicator, at least one index of the one or more carriers, a deactivation time point, a deactivation duration, and an SPS configuration indicator.

When the deactivation duration ends, the one or more carriers may be activated.

The SPS configuration indicator may indicate whether the original SPS configuration or the changed SPS configuration is applied to the at least one remaining carrier.

Furthermore, according to embodiments of the present disclosure, an operation method of a first terminal in a V2X communication system may include: performing V2X communication with a second terminal based on an original semi-persistent scheduling (SPS) configuration in a first carrier; receiving from a base station a radio resource control (RRC) message including a changed SPS configuration to be applied to aggregated carriers including the first carrier; and performing the V2X communication with the second terminal based on the changed SPS configuration to be applied to the aggregated carriers.

The changed SPS configuration may include at least one of data transmission intervals in the aggregated carriers, an offset between the data transmission intervals, and a size of data transmittable in each of the aggregated carriers.

The RRC message may further include at least one index of at least one remaining carrier excluding the first carrier among the aggregated carriers.

The RRC message may further include information indicating an application time point of the changed SPS configuration, the V2X communication between the first terminal and the second terminal may be performed using the first carrier before the application time point, and the V2X communication between the first terminal and the second terminal may be performed using the aggregated carriers after the application time point.

Furthermore, according to embodiments of the present disclosure, an operation method of a first terminal in a V2X communication system may include: performing V2X communication with a second terminal based on an original semi-persistent scheduling (SPS) configuration in a first carrier; receiving from a base station a radio resource control (RRC) message including information characterizing a second carrier to be aggregated with the first carrier; receiving sidelink control information (SCI) from the second terminal, the SCI including a changed SPS configuration to be applied to aggregated carriers including the first carrier and the second carrier; and performing the V2X communication with the second terminal based on the changed SPS configuration to be applied to the aggregated carriers. The first carrier may be different from the second carrier.

The changed SPS configuration may include at least one of data transmission intervals in the aggregated carriers, an offset between the data transmission intervals, and a size of data transmittable in each of the aggregated carriers.

The SCI may further include a flag indicating an application time point of the changed SPS configuration.

The operation method may further comprise receiving a medium access control (MAC) control element (CE) from the second terminal, the MAC CE including deactivation-related information; and performing the V2X communication with the second terminal using remaining carriers excluding one or more carriers indicated by the deactivation-related information among the aggregated carriers.

The deactivation-related information may include at least one of a deactivation indicator, an index of the one or more carriers, a deactivation time point, a deactivation duration, and an SPS configuration indicator.

The SPS configuration indicator may indicate whether the original SPS configuration or the changed SPS configuration is applied to the remaining carriers.

According to the embodiments of the present disclosure, an SPS configuration to be applied to aggregated carriers in the V2X communication system may be transmitted through at least one of an RRC message, a MAC CE, and an SCI. In addition, an application flag indicating when the SPS configuration is to be applied may be transmitted with the SPS configuration. Thus, the terminals participating in the V2X communication can obtain the SPS configuration and application flag, and can perform the V2X communication using the aggregated carriers based on the SPS configuration and application flag.

Meanwhile, a deactivation indicator requesting deactivation of one or more of the aggregated carriers may be transmitted using a MAC CE or an SCI. Thus, the terminals participating in the V2X communication can obtain the deactivation indicator, and can perform the V2X communication using the remaining carrier(s) except one or more carriers that are deactivated among the aggregated carriers.

BRIEF DESCRIPTION OF DRAWINGS

Embodiments of the present disclosure will become more apparent by describing in detail embodiments of the present disclosure with reference to the accompanying drawings, in which.

Figure 1:
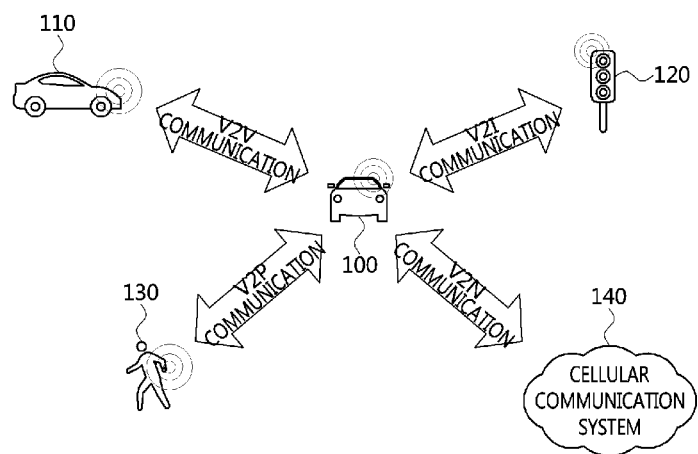
FIG. 1 is a conceptual diagram illustrating V2X communication scenarios.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Embodiments of the present disclosure are disclosed herein. However, specific structural and functional details disclosed herein are merely representative for purposes of describing embodiments of the present disclosure, however, embodiments of the present disclosure may be embodied in many alternate forms and should not be construed as limited to embodiments of the present disclosure set forth herein.

Accordingly, while the present disclosure is susceptible to various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one control unit. The term "control unit" may refer to a hardware device that includes a memory and a processor. The memory is configured to store program instructions, and the processor is specifically programmed to execute the program instructions to perform one or more processes which are described further below. The control unit may control operation of units, modules, parts, devices, or the like, as described herein. Moreover, it is understood that the below methods may be executed by an apparatus comprising the control unit in conjunction with one or more other components, as would be appreciated by a person of ordinary skill in the art.

Hereinafter, embodiments of the present disclosure will be described in greater detail with reference to the accompanying drawings. In order to facilitate general understanding in describing the present disclosure, the same components in the drawings are denoted with the same reference signs, and repeated description thereof will be omitted.

FIG. 1 is a conceptual diagram illustrating V2X communication scenarios.

As shown in FIG. 1, the V2X communications may include Vehicle-to-Vehicle (V2V) communications, Vehicle-to-Infrastructure (V2I) communications, Vehicle-to-Pedestrian (V2P) communications, Vehicle-to-Network (V2N) communications, and the like. The V2X communications may be supported by a cellular communication system (e.g., a cellular communication system 140), and the V2X communications supported by the cellular communication system 140 may be referred to as 'Cellular-V2X (C-V2X) communications'. Here, the cellular communication system 140 may include the 4G communication system (e.g., LTE communication system or LTE-A communication system), the 5G communication system (e.g., NR communication system), and the like.

The V2V communications may be communications between a first vehicle 100 (e.g., a communication node located in the vehicle 100) and a second vehicle 110 (e.g., a communication node located in the vehicle 110). Various driving information such as velocity, heading, time, position, and the like may be exchanged between the vehicles 100 and 110 through the V2V communications. For example, autonomous driving (e.g., platooning) may be supported based on the driving information exchanged through the V2V communications. The V2V communications supported in the cellular communication system 140 may be performed based on sidelink communication technologies (e.g., ProSe and D2D communication technologies, and the like). In this case, the communications between the vehicles 100 and 110 may be performed using at least one sidelink channel established between the vehicles 100 and 110.

The V2I communications may be communications between the first vehicle 100 (e.g., the communication node located in the vehicle 100) and an infrastructure (e.g., road side unit (RSU)) 120 located on a roadside. The infrastructure 120 may also be a traffic light or a street light which is located on the roadside. For example, when the V2I communication is performed, the communications may be performed between the communication node located in the first vehicle 100 and a communication node located in a traffic light. Traffic information, driving information, and the like may be exchanged between the first vehicle 100 and the infrastructure 120 through the V2I communications. The V2I communications supported in the cellular communication system 140 may also be performed based on sidelink communication technologies (e.g., ProSe and D2D communication technologies, and the like). In this case, the communications between the vehicle 100 and the infrastructure 120 may be performed using at least one sidelink channel established between the vehicle 100 and the infrastructure 120.

The V2P communications may be communications between the first vehicle 100 (e.g., the communication node located in the vehicle 100) and a person 130 (e.g., a communication node carried by the person 130). The driving information of the first vehicle 100 and movement information of the person 130 such as velocity, heading, time, position, and the like may be exchanged between the vehicle 100 and the person 130 through the V2P communications. The communication node located in the vehicle 100 or the communication node carried by the person 130 may generate an alarm indicating a danger by judging a dangerous situation based on the obtained driving information and movement information. The V2P communications supported in the cellular communication system 140 may be performed based on sidelink communication technologies (e.g., ProSe and D2D communication technologies, and the like). In this case, the communications between the communication node located in the vehicle 100 and the communication node carried by the person 130 may be performed using at least one sidelink channel established between the communication nodes.

The V2N communications may be communications between the first vehicle 100 (e.g., the communication node located in the vehicle 100) and a server connected through the cellular communication system 140. The V2N communications may be performed based on the 4G communication technology (e.g., LTE or LTE-A) or the 5G communication technology (e.g., NR). Also, the V2N communications may be performed based on a Wireless Access in Vehicular Environments (WAVE) communication technology or a Wireless Local Area Network (WLAN) communication technology which is defined in Institute of Electrical and Electronics Engineers (IEEE) 802.11, or a Wireless Personal Area Network (WPAN) communication technology defined in IEEE 802.15.

Meanwhile, the cellular communication system 140 supporting the V2X communications may be configured as follows.

Figure 2:
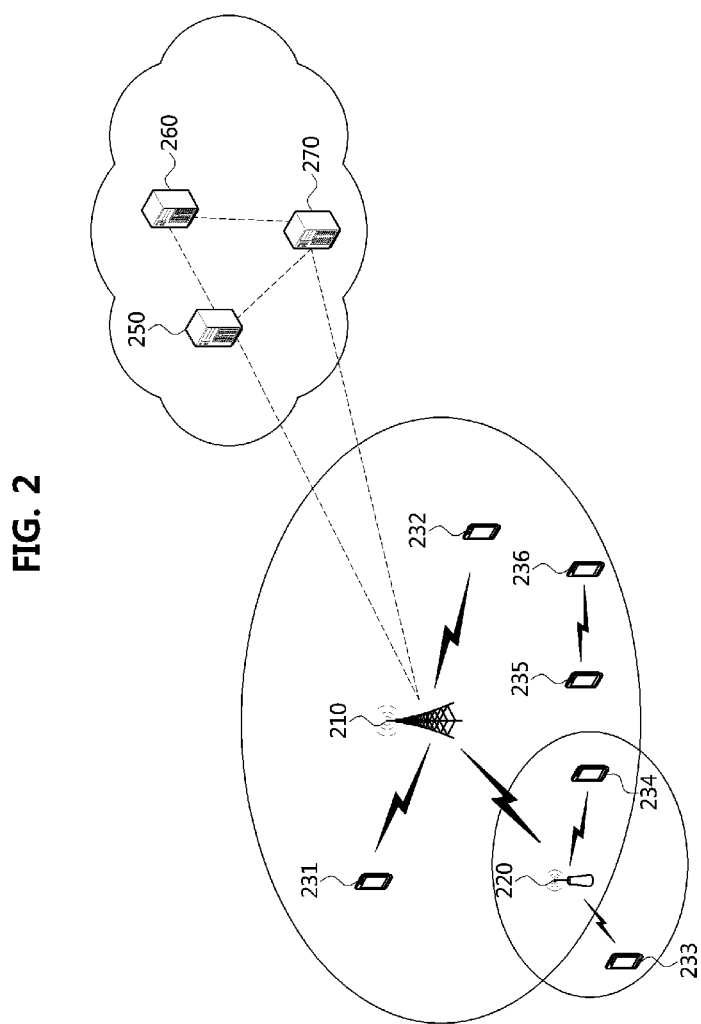
FIG. 2 is a conceptual diagram illustrating a first embodiment of a cellular communication system.

FIG. 2 is a conceptual diagram illustrating an embodiment of a cellular communication system.

As shown in FIG. 2, a cellular communication system may include an access network, a core network, and the like. The access network may include a base station 210, a relay 220, User Equipments (UEs) 231 through 236, and the like. The UEs 231 through 236 may include communication nodes located in the vehicles 100 and 110 of FIG. 1, the communication node located in the infrastructure 120 of FIG. 1, the communication node carried by the person 130 of FIG. 1, and the like. When the cellular communication system supports the 4G communication technology, the core network may include a serving gateway (S-GW) 250, a packet data network (PDN) gateway (P-GW) 260, a mobility management entity (MME) 270, and the like.

When the cellular communication system supports the 5G communication technology, the core network may include a user plane function (UPF) 250, a session management function (SMF) 260, an access and mobility management function (AMF) 270, and the like. Alternatively, when the cellular communication system operates in a Non-Stand Alone (NSA) mode, the core network constituted by the S-GW 250, the P-GW 260, and the MME 270 may support the 5G communication technology as well as the 4G communication technology, or the core network constituted by the UPF 250, the SMF 260, and the AMF 270 may support the 4G communication technology as well as the 5G communication technology.

Also, when the cellular communication system supports a network slicing technique, the core network may be divided into a plurality of logical network slices. For example, a network slice supporting V2X communications (e.g., a V2V network slice, a V2I network slice, a V2P network slice, a V2N network slice, etc.) may be configured, and the V2X communications may be supported through the V2X network slice configured in the core network.

The communication nodes (e.g., base station, relay, UE, S-GW, P-GW, MME, UPF, SMF, AMF, etc.) constituting the cellular communication system may perform communications by using at least one communication technology among a code division multiple access (CDMA) technology, a time division multiple access (TDMA) technology, a frequency division multiple access (FDMA) technology, an orthogonal frequency division multiplexing (OFDM) technology, a filtered OFDM technology, an orthogonal frequency division multiple access (OFDMA) technology, a single carrier FDMA (SC-FDMA) technology, a non-orthogonal multiple access (NOMA) technology, a generalized frequency division multiplexing (GFDM) technology, a filter bank multi-carrier (FBMC) technology, a universal filtered multi-carrier (UFMC) technology, and a space division multiple access (SDMA) technology.

The communication nodes (e.g., base station, relay, UE, S-GW, P-GW, MME, UPF, SMF, AMF, etc.) constituting the cellular communication system may be configured as follows.

Figure 3:
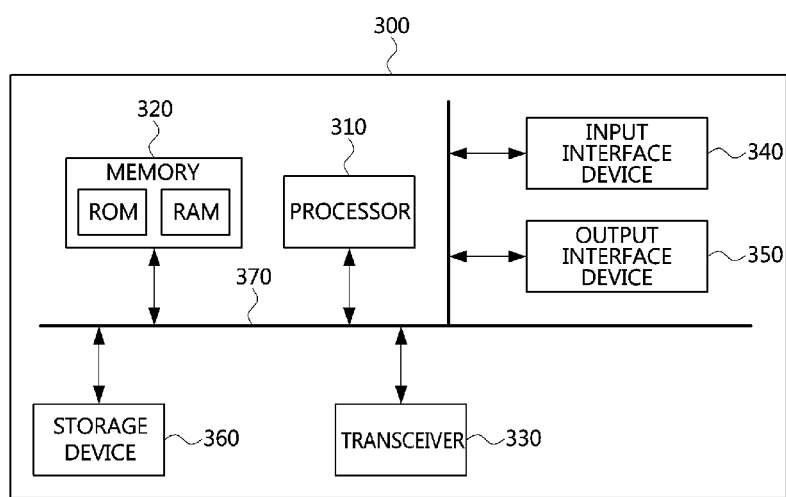
FIG. 3 is a conceptual diagram illustrating a first embodiment of a communication node constituting a cellular communication system.

FIG. 3 is a conceptual diagram illustrating an embodiment of a communication node constituting a cellular communication system.

As shown in FIG. 3, a communication node 300 may comprise at least one processor 310, a memory 320, and a transceiver 330 connected to a network for performing communications. Also, the communication node 300 may further comprise an input interface device 340, an output interface device 350, a storage device 360, and the like. Each component included in the communication node 300 may communicate with each other as connected through a bus 370.

However, each of the components included in the communication node 300 may be connected to the processor 310 via a separate interface or a separate bus rather than the common bus 370. For example, the processor 310 may be connected to at least one of the memory 320, the transceiver 330, the input interface device 340, the output interface device 350, and the storage device 360 via a dedicated interface.

The processor 310 may execute at least one instruction stored in at least one of the memory 320 and the storage device 360. The processor 310 may refer to a central processing unit (CPU), a graphics processing unit (GPU), or a dedicated processor on which methods in accordance with embodiments of the present disclosure are performed. Each of the memory 320 and the storage device 360 may be constituted by at least one of a volatile storage medium and a non-volatile storage medium. For example, the memory 320 may comprise at least one of read-only memory (ROM) and random access memory (RAM).

Referring again to FIG. 2, in the communication system, the base station 210 may form a macro cell or a small cell, and may be connected to the core network via an ideal backhaul or a non-ideal backhaul. The base station 210 may transmit signals received from the core network to the UEs 231 through 236 and the relay 220, and may transmit signals received from the UEs 231 through 236 and the relay 220 to the core network. The UEs 231, 232, 234, 235 and 236 may belong to cell coverage of the base station 210. The UEs 231, 232, 234, 235 and 236 may be connected to the base station 210 by performing a connection establishment procedure with the base station 210. The UEs 231, 232, 234, 235 and 236 may communicate with the base station 210 after being connected to the base station 210.

The relay 220 may be connected to the base station 210 and may relay communications between the base station 210 and the UEs 233 and 234. That is, the relay 220 may transmit signals received from the base station 210 to the UEs 233 and 234, and may transmit signals received from the UEs 233 and 234 to the base station 210. The UE 234 may belong to both of the cell coverage of the base station 210 and the cell coverage of the relay 220, and the UE 233 may belong to the cell coverage of the relay 220. That is, the UE 233 may be located outside the cell coverage of the base station 210. The UEs 233 and 234 may be connected to the relay 220 by performing a connection establishment procedure with the relay 220. The UEs 233 and 234 may communicate with the relay 220 after being connected to the relay 220.

The base station 210 and the relay 220 may support multiple-input multiple-output (MIMO) technologies (e.g., single user (SU)-MIMO, multi user (MU)-MIMO, massive MIMO, etc.), coordinated multipoint (CoMP) communication technologies, carrier aggregation (CA) communication technologies, unlicensed band communication technologies (e.g., Licensed Assisted Access (LAA), enhanced LAA (eLAA), etc.), sidelink communication technologies (e.g., ProSe communication technology, D2D communication technology), or the like. The UEs 231, 232, 235 and 236 may perform operations corresponding to the base station 210 and operations supported by the base station 210. The UEs 233 and 234 may perform operations corresponding to the relays 220 and operations supported by the relays 220.

Here, the base station 210 may be referred to as a Node B (NB), an evolved Node B (eNB), a base transceiver station (BTS), a radio remote head (RRH), a transmission reception point (TRP), a radio unit (RU), a roadside unit (RSU), a radio transceiver, an access point, an access node, or the like. The relay 220 may be referred to as a small base station, a relay node, or the like. Each of the UEs 231 through 236 may be referred to as a terminal, an access terminal, a mobile terminal, a station, a subscriber station, a mobile station, a portable subscriber station a subscriber station, a node, a device, an on-broad unit (OBU), or the like.

Meanwhile, the communications between the UEs 235 and 236 may be performed based on the sidelink communication technique. The sidelink communications may be performed based on a one-to-one scheme or a one-to-many scheme. When V2V communication is performed using the sidelink communication technique, the UE 235 may be the communication node located in the first vehicle 100 of FIG. 1 and the UE 236 may be the communication node located in the second vehicle 110 of FIG. 1. When V2I communication is performed using the sidelink communication technique, the UE 235 may be the communication node located in first vehicle 100 of FIG. 1 and the UE 236 may be the communication node located in the infrastructure 120 of FIG. 1. When V2P communication is performed using the sidelink communication technique, the UE 235 may be the communication node located in first vehicle 100 of FIG. 1 and the UE 236 may be the communication node carried by the person 130 of FIG. 1.

The scenarios to which the sidelink communications are applied may be classified as shown in Table 1 according to the positions of the UEs (e.g., the UEs 235 and 236) participating in the sidelink communications. For example, the scenario for the sidelink communications between the UEs 235 and 236 shown in FIG. 2 may be a sidelink communication scenario C.

TABLE 1

| Sidelink Communication Scenario | Position of UE 235 | Position of UE 236 |
| --- | --- | --- |
| A | Out of coverage of base station 210 | Out of coverage of base station 210 |
| B | In coverage of base station 210 | Out of coverage of base station 210 |
| C | In coverage of base station 210 | In coverage of base station 210 |
| D | In coverage of base station 210 | In coverage of other base station 210 |

Meanwhile, a user plane protocol stack of the UEs (e.g., the UEs 235 and 236) performing sidelink communications may be configured as follows.

Figure 4:
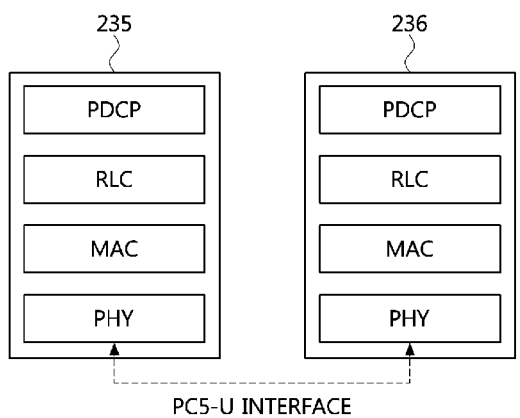
FIG. 4 is a block diagram illustrating a first embodiment of a user plane protocol stack of an UE performing sidelink communication.

FIG. 4 is a block diagram illustrating a first embodiment of a user plane protocol stack of an UE performing sidelink communication.

As shown in FIG. 4, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The user plane protocol stack of each of the UEs 235 and 236 may comprise a physical (PHY) layer, a medium access control (MAC) layer, a radio link control (RLC) layer, and a packet data convergence protocol (PDCP) layer.

The sidelink communications between the UEs 235 and 236 may be performed using a PC5 interface (e.g., PC5-U interface). A layer-2 identifier (ID) (e.g., a source layer-2 ID, a destination layer-2 ID) may be used for the sidelink communications and the layer 2-ID may be an ID configured for the V2X communications. Also, in the sidelink communications, a hybrid automatic repeat request (HARQ) feedback operation may be supported, and an RLC acknowledged mode (RLC AM) or an RLC unacknowledged mode (RLC UM) may be supported.

Meanwhile, a control plane protocol stack of the UEs (e.g., the UEs 235 and 236) performing sidelink communications may be configured as follows.

Figure 5:
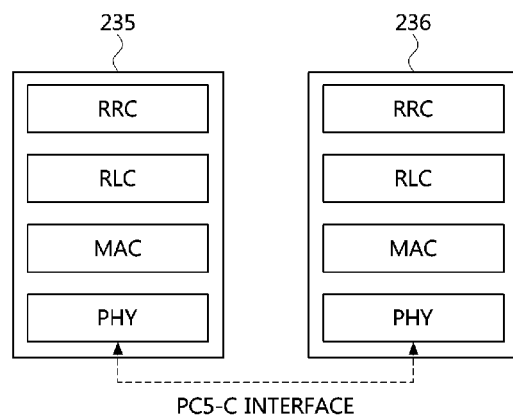
FIG. 5 is a block diagram illustrating a first embodiment of a control plane protocol stack of an UE performing sidelink communication.
Figure 6:
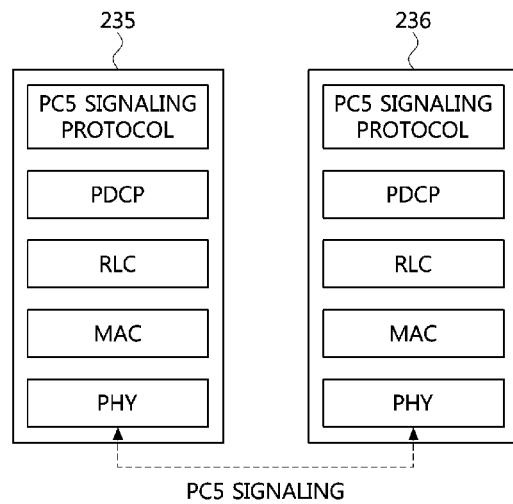
FIG. 6 is a block diagram illustrating a second embodiment of a control plane protocol stack of an UE performing sidelink communication.

FIG. 5 is a block diagram illustrating a first embodiment of a control plane protocol stack of an UE performing sidelink communication, and FIG. 6 is a block diagram illustrating a second embodiment of a control plane protocol stack of an UE performing sidelink communication.

As shown in FIGS. 5 and 6, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The control plane protocol stack illustrated in FIG. 5 may be a control plane protocol stack for transmission and reception of broadcast information (e.g., Physical Sidelink Broadcast Channel (PSBCH)).

The control plane protocol stack shown in FIG. 5 may include a PHY layer, a MAC layer, an RLC layer, and a radio resource control (RRC) layer. The sidelink communications between the UEs 235 and 236 may be performed using a PC5 interface (e.g., PC5-C interface). The control plane protocol stack shown in FIG. 6 may be a control plane protocol stack for one-to-one sidelink communication. The control plane protocol stack shown in FIG. 6 may include a PHY layer, a MAC layer, an RLC layer, a PDCP layer, and a PC5 signaling protocol layer.

Meanwhile, channels used in the sidelink communications between the UEs 235 and 236 may include a Physical Sidelink Shared Channel (PSSCH), a Physical Sidelink Control Channel (PSCCH), a Physical Sidelink Discovery Channel (PSDCH), and a Physical Sidelink Broadcast Channel (PSBCH). The PSSCH may be used for transmitting and receiving sidelink data and may be configured in the UE (e.g., UE 235 or 236) by a higher layer signaling. The PSCCH may be used for transmitting and receiving sidelink control information (SCI) and may also be configured in the UE (e.g., UE 235 or 236) by a higher layer signaling.

The PSDCH may be used for a discovery procedure. For example, a discovery signal may be transmitted over the PSDCH. The PSBCH may be used for transmitting and receiving broadcast information (e.g., system information). Also, a demodulation reference signal (DM-RS), a synchronization signal, or the like may be used in the sidelink communications between the UEs 235 and 236.

Meanwhile, a sidelink transmission mode (TM) may be classified into sidelink TMs 1 to 4 as shown in Table 2 below.

TABLE 2

| Sidelink TM | Description |
|---|---|
| 1 | Transmission using resources scheduled by base station |
| 2 | UE autonomous transmission without scheduling of base station |
| 3 | Transmission using resources scheduled by base station in V2X communications |
| 4 | UE autonomous transmission without scheduling of base station in V2X communications |

When the sidelink TM 3 or 4 is supported, each of the UEs 235 and 236 may perform sidelink communications using a resource pool configured by the base station 210. The resource pool may be configured for each of the sidelink control information and the sidelink data.

The resource pool for the sidelink control information may be configured based on an RRC signaling procedure (e.g., a dedicated RRC signaling procedure, a broadcast RRC signaling procedure). The resource pool used for reception of the sidelink control information may be configured by a broadcast RRC signaling procedure. When the sidelink TM 3 is supported, the resource pool used for transmission of the sidelink control information may be configured by a dedicated RRC signaling procedure. In this case, the sidelink control information may be transmitted through resources scheduled by the base station 210 within the resource pool configured by the dedicated RRC signaling procedure. When the sidelink TM 4 is supported, the resource pool used for transmission of the sidelink control information may be configured by a dedicated RRC signaling procedure or a broadcast RRC signaling procedure. In this case, the sidelink control information may be transmitted through resources selected autonomously by the UE (e.g., UE 235 or 236) within the resource pool configured by the dedicated RRC signaling procedure or the broadcast RRC signaling procedure.

When the sidelink TM 3 is supported, the resource pool for transmitting and receiving sidelink data may not be configured. In this case, the sidelink data may be transmitted and received through resources scheduled by the base station 210. When the sidelink TM 4 is supported, the resource pool for transmitting and receiving sidelink data may be configured by a dedicated RRC signaling procedure or a broadcast RRC signaling procedure. In this case, the sidelink data may be transmitted and received through resources selected autonomously by the UE (e.g., UE 235 or 236) within the resource pool configured by the dedicated RRC signaling procedure or the broadcast RRC signaling procedure.

Hereinafter, methods for load distribution using a plurality of carriers (e.g., a plurality of channels) in the communication system (e.g., the cellular communication system) supporting V2X communications as described above will be described. Even when a method (e.g., transmission or reception of a signal) to be performed at a first communication node among communication nodes is described, a corresponding second communication node may perform a method (e.g., reception or transmission of the signal) corresponding to the method performed at the first communication node. That is, when an operation of the vehicle 100 is described, the corresponding vehicle 110 may perform an operation corresponding to the operation of the vehicle 100. Conversely, when an operation of the vehicle 110 is described, the corresponding vehicle 100 may perform an operation corresponding to the operation of the vehicle 110. In the embodiments described below, the operation of the vehicle may be the operation of the communication node located in the vehicle.

In the communication system supporting V2X communications, the vehicle may perform communications based on the CA scheme. For example, the vehicle may perform communications using a primary carrier and one or more secondary carriers. The carrier used for the V2X communications may be determined based on channel state information (e.g., Channel Busy Ratio (CBR)). The CBR may indicate congestion, occupancy state, load state, etc. of the corresponding carrier (e.g., channel). In this case, the vehicle may measure the CBR in the carrier according to a periodic or specific event, and may transmit the measured CBR to the base station. The base station may identify a channel congestion (e.g., occupancy state, load state) based on the CBR measured by the vehicle, and determine resources (e.g., carrier, resource pool) to be allocated to the vehicle based on the measured channel congestion.

When the sidelink TM 3 is used, the base station may configure time-frequency resources used for data transmission and may inform the vehicle of information characterizing the configured time-frequency resources (i.e., scheduling information). Also, the base station may allocate time-frequency resources based on a semi-persistent scheduling (SPS) scheme. For example, the base station may configure up to eight SPS configurations having different parameters, and may transmit an SPS configuration activation message or an SPS deactivation request message to the vehicle through a signaling procedure.

The SPS configuration may be configured based on UE assistance information received from the vehicle. The UE assistance information may include traffic characteristic parameters, and the traffic characteristic parameters may include a set of preferred or expected SPS intervals, a timing offset associated with a subframe #0 within a system frame of a system frame number (SFN) #0, a ProSe Per-Packet Priority (PPPP), a maximum Transport Block Size (TBS) according to a traffic pattern, or the like.

When the sidelink TM 4 is used, the base station may configure the resource pool used for data transmission and may inform the vehicle of information characterizing the configured resource pool. In this case, the vehicle may select a time-frequency resource that is not used by other communication nodes through channel sensing in the resource pool, and may perform communications using the selected time-frequency resource. For example, the time-frequency resource may be selected based on a distributed congestion control scheme. Also, the vehicle may adjust transmission parameters (e.g., a maximum transmission power, a range of retransmission counts per transport block (TB), etc.) based on the CBR, and perform communications using the adjusted transmission parameters. When the sidelink TM 4 is used, a vehicle located outside the coverage of the base station may also perform communications using time-frequency resources in a resource pool pre-configured by the base station.

However, when a load on the carrier to which the SPS configuration is applied increases, data of the vehicle (e.g., data having high-reliability and low-latency requirements, Decentralized Environment Notification Message (DENM), Cooperative Awareness Message (CAM), etc.) may not be successfully transmitted or received. Also, a transmission latency of the data may increase, and thus a requested quality of service (QoS) may not be satisfied. The load distribution methods to solve this problem may be as follows.

Figure 7:
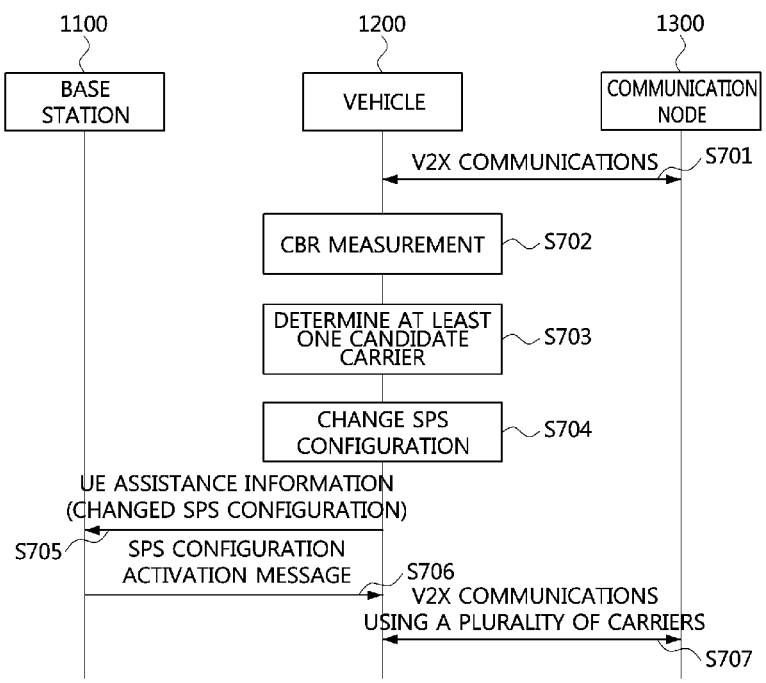
FIG. 7 is a sequence chart illustrating a first embodiment of a load distribution method using a plurality of carriers according to the present disclosure.

FIG. 7 is a sequence chart illustrating a first embodiment of a load distribution method using a plurality of carriers according to the present disclosure.

As shown in FIG. 7, a V2X communication system may include a base station 1100, a vehicle 1200 (i.e., a communication node located in a vehicle), a communication node 1300, and the like. For example, the base station 1100 of FIG. 7 may be the base station belonging to the cellular communication system 140 of FIG. 1. The vehicle 1200 of FIG. 7 may be the vehicle 100 of FIG. 1, and the communication node 1300 of FIG. 7 may be the communication node located in the vehicle 110 of FIG. 1, the communication node located in the infrastructure 120, or the communication node carried by the person 130. The V2X communications may be performed based on the side link TM 3 or TM 4. Also, the SPS scheme and/or the CA scheme may be applied to the V2X communication system. The data transmitted or received based on the SPS scheme may be referred to as "SPS traffic," and a carrier may be referred to as a "frequency band," a "bandwidth part (BWP)," a "V2X frequency band," or a "V2X frequency."

The vehicle 1200 may perform the V2X communication with the communication node 1300 based on a SPS configuration set by the base station 1100 (S701). Here, the V2X communication may be performed using one or more carriers. The vehicle 1200 may measure channel states (e.g., CBRs) for the one or more carriers in which the V2X communication is performed (S702). Also, the vehicle 1200 may measure channel states of all the carriers configured for the vehicle as well as the carrier (e.g., primary carrier or anchor carrier) in which the V2X communication is performed. That is, the vehicle 1200 may measure CBRs for all the aggregated carriers (e.g., all carriers to which the CA scheme is applied). The CBR measurement may be performed periodically or when a specific event (e.g., a request from the base station 1100) occurs. The vehicle 1200 may compare the measured CBR with a preconfigured threshold and determine that an overload has occurred in the corresponding carrier if the measured CBR is equal to or greater than the preconfigured threshold.

When an overload occurs in the carrier, the vehicle 1200 may determine at least one candidate carrier (e.g., secondary carrier) capable of load distribution (S703). The at least one candidate carrier may include a carrier that can be activated among the carriers aggregated with the carrier used in the step S701. For example, a carrier having a CBR below the predetermined threshold among the aggregated carriers may be determined as the candidate carrier.

In case that the SPS configuration of the carrier used in the step S701 for the V2X communication is equally applied to the at least one candidate carrier determined in the step S703, the vehicle 1200 may transmit, to the base station 1100, UE assistance information including information characterizing the at least one candidate carrier (e.g., indexes of candidate carriers, the number of candidate carriers, etc.) determined in the step S703 (S705). Alternatively, in the step S705, sidelink UE information may be used instead of the UE assistance information. The UE assistance information or the sidelink UE information may be transmitted via a carrier (e.g., primary carrier between the vehicle 1200 and the base station 1100). The candidate carrier information included in the UE assistance information (or, sidelink UE information) may be information indicating a frequency band (e.g., BWP) available for transmission of the SPS traffic. For example, the candidate carrier information included in the UE assistance information (or, sidelink UE information) may indicate a set of frequency bands (e.g., a set of BWPs).

TABLE 3

| Frequency band set | Frequency band #1 | Frequency band #2 | Frequency band #3 |
|---|---|---|---|
| 000 | X | X | X |
| 001 | O | X | X |
| 010 | O | O | X |
| 011 | X | O | X |
| 100 | X | O | O |
| 101 | X | X | O |
| 110 | O | X | O |
| 111 | O | O | O |

In Table 3, the frequency bands indicated as 'X' may indicate frequency bands not available for transmission of the SPS traffic, and the frequency bands indicated as 'O' may indicate frequency bands available for transmission of the SPS traffic. For example, when the candidate carrier information included in the UE assistance information is set to '100', the base station 1100 may determine that the frequency bands #2 and #3 are available for transmission of the SPS traffic. In Table 3, when each of the set of frequency bands, the frequency band #1, the frequency band #2, and the frequency band #3 indicates the set of BWPs, the BWP #1, the BWP #2, and the BWP #3, the candidate carrier information set as '100' may indicate that the BWPs #2 and #3 are available for transmission of the SPS traffic.

Alternatively, the frequency bands (e.g., BWP) available for transmission of the SPS traffic indicated by the UE assistance information (or, sidelink UE information) may be represented in a bitmap form. When the frequency bands for the V2X communication are the frequency bands #1 to #4, the first bit of the bitmap consisting of 4 bits may indicate availability of the frequency band #1, the second bit may indicate availability of the frequency band #2, the third bit may indicate availability of the frequency band #3, and the fourth bit may indicate availability of the frequency band #4. For example, when the information indicating the frequency bands included in the UE assistance information (or, sidelink UE information) is set to '1011', the UE assistance information (or, sidelink UE information) may indicate that the frequency bands #1, #3 and #4 are available for transmission of the SPS traffic.

Meanwhile, the base station 1100 may receive the UE assistance information from the vehicle 1200, and identify the candidate carrier information included in the UE assistance information. In this case, the base station 1100 may transmit a message (hereinafter referred to as 'SPS configuration activation message') indicating activation of the SPS configuration in the at least one candidate carrier indicated by the UE assistance information to the vehicle 1200 (S706). The SPS configuration activation message may indicate at least one index of the at least one candidate carrier for which the SPS configuration is activated.

The vehicle 1200 may receive the SPS configuration activation message from the base station 1100 and may perform V2X communication with the communication node 1300 using the anchor carrier (i.e., the carrier used for the V2X communications in the step S701) and the at least one candidate carrier (S707). Alternatively, the vehicle 1200 may perform V2X communication with the communication node 1300 using the anchor carrier and the at least one candidate carrier without receiving the SPS configuration activation message after the transmission of the UE assistance information (S707). Here, the SPS configuration applied to the V2X communications using the anchor carrier and the at least one candidate carrier may be the same as the SPS configuration applied to the V2X communication in the step S701.

Meanwhile, the SPS configuration (e.g., SPS parameters) may be changed based on the number of candidate carriers determined in the step S703. In this case, the vehicle may change the SPS configuration based on the number of candidate carriers (S704). The step S704 may be performed based on an SPS configuration change scheme 1, 2 or 3.

SPS Configuration Change Scheme 1

When a sum of the number of anchor carriers (i.e., the number of carriers used for V2X communication in the step S701) and the number of candidate carriers is N, and a data transmission interval in the SPS configuration of the at least one anchor carrier is T transmission time intervals (TTIs), the vehicle 1200 may set a data transmission interval to N×T TTIs in each of the anchor carrier and the at least one candidate carrier, and set an offset between data transmission intervals of the N carriers (e.g., the at least one anchor carrier and the at least one candidate carrier) to T TTIs. For example, when N is 2 and T is 5, the data transmission interval in each of two carriers (e.g., carriers #0 and #1) may be set to 10 TTIs, and an offset between data transmission intervals of the two carriers may be set to 5 TTIs. That is, when a radio frame is composed of subframes #0 to #9, the V2X communications may be performed using the subframe #0 in the carrier #0, and performed using the subframe #5 in the carrier #1.

SPS Configuration Change Scheme 2

When a sum of the number of anchor carriers (i.e., the number of carriers used for V2X communication in the step S701) and the number of candidate carriers is N, and a data transmission interval in the SPS configuration of the anchor carrier is T TTIs, the vehicle 1200 may maintain the data transmission interval to be T TTIs in the anchor carrier and the at least one candidate carrier, set an offset between data transmission intervals of the N carriers (e.g., the anchor carrier and the candidate carrier) to M TTIs (M is an integer equal to or greater than 0), and set a size of data transmitted through each of the N carriers to (a size of total data to be transmitted to the communication node/N). That is, data of the same size may be transmitted in each of the N carriers.

For example, when N is 2, T is 5, M is 0, and the size of total data corresponds to 10 TBs, the data transmission interval in each of the two carriers may be set to 5 TTIs, an offset between data transmission intervals of the two carriers may be set to 0 TTI, and the size of data transmitted in each of the two carriers may correspond to 5 TBs.

SPS Configuration Change Scheme 3

When a sum of the number of anchor carriers (i.e., the number of carriers used for V2X communication in the step S701) and the number of candidate carriers is N, and the data transmission interval in the SPS configuration of the anchor carrier is T TTIs, the vehicle may maintain the data transmission interval to be T TTIs in the anchor carrier and the at least one candidate carrier, set an offset between data transmission intervals of the N carriers (e.g., the anchor carrier and the at least one candidate carrier) to M TTIs (M is an integer equal to or greater than 0), and set the size of data transmitted through each of the N carriers to be in inverse proportion to the CBR of each of the N carriers. That is, data can be distributed in consideration of channel congestion in each of the N carriers.

For example, when N is 2, T is 5, M is 0, the size of total data corresponds to 10 TBs, the CBR in the anchor carrier is 80%, and the CBR in the candidate carrier is 20%, the data transmission interval in each of the two carriers may be set to 5 TTIs, an offset between the data transmission intervals of the two carriers may be set to 0 TTI, the size of data transmitted through the anchor carrier may correspond to 2 TBs, and the size of data transmitted through the candidate carrier may correspond to 8 TBs.

When the step S704 is completed, the vehicle 1200 may generate UE assistance information including the changed SPS configuration (e.g., changed SPS parameters). When the SPS configuration change scheme 1 is used, the UE assistance information may include the candidate carrier information (e.g., indexes of candidate carriers, the number of candidate carriers), the data transmission interval (N×T), the offset between data transmission intervals (T), and the like. When the SPS configuration change scheme 2 is used, the UE assistance information may include the candidate carrier information (e.g., indexes of candidate carriers, the number of candidate carriers), the data transmission interval (T), the offset between data transmission intervals (M), the size of data which can be transmitted in each carrier (i.e., the size of data is the same in all carriers), and the like. Here, the size of data may be equal in the carriers. When the SPS configuration change scheme 3 is used, the RRC connection reconfiguration message may include the candidate carrier information (e.g., indexes of candidate carriers, the number of candidate carriers), the data transmission interval (T), the offset between data transmission intervals (M), the size of data which can be transmitted in each carrier, and the like. Here, the data size may be inversely proportional to the channel congestion in each of the carriers.

The vehicle 1200 may transmit the UE assistance information including the changed SPS configuration (e.g., changed SPS parameters) to the base station 1100 (S705). The UE assistance information may be transmitted via the primary carrier. The candidate carrier information included in the UE assistance information may be information indicating a frequency band available for transmission of the SPS traffic. For example, the candidate carrier information included in the UE assistance information may indicate a set of frequency bands available for transmission of the SPS traffic (e.g., the set described in Table 3). Alternatively, the frequency bands available for transmission of the SPS traffic indicated by the UE assistance information may be represented in a bitmap form.

Meanwhile, the base station 1100 may receive the UE assistance information from the vehicle 1200 and may identify the changed SPS configuration included in the UE assistance information. In this case, the base station 1100 may transmit to the vehicle 1200 an SPS configuration activation message indicating activation of the changed SPS configuration indicated by the UE assistance information (S706). The SPS configuration activation message may indicate indexes of the carriers on which the changed SPS configuration is activated.

The vehicle 1200 may receive the SPS configuration activation message from the base station 1100 and may perform V2X communication with the communication node 1300 in the anchor carrier and the candidate carrier using the changed SPS configuration (S707). Alternatively, the vehicle 1200 may perform V2X communication with the communication node 1300 in the anchor carrier and the at least one candidate carrier using the changed SPS configuration without receiving the SPS configuration activation message after transmission of the UE assistance information (S707).

Figure 8:
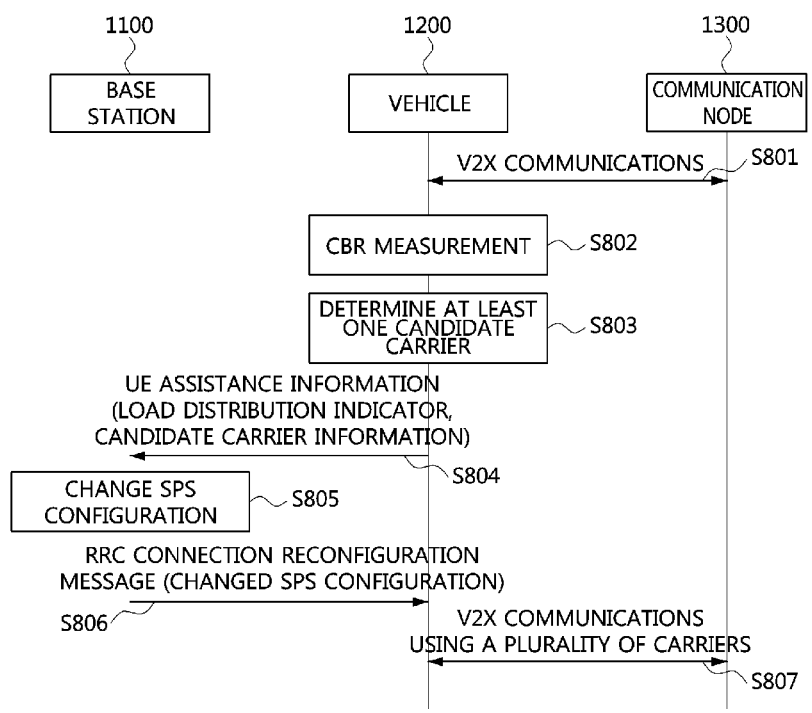
FIG. 8 is a sequence chart illustrating a second embodiment of a load distribution method using a plurality of carriers according to the present disclosure.

FIG. 8 is a sequence chart illustrating a second embodiment of a load distribution method using a plurality of carriers according to the present disclosure.

As shown in FIG. 8, a V2X communication system may include a base station 1100, a vehicle 1200 (e.g., a communication node located in a vehicle), a communication node 1300, and the like. For example, the base station 1100 of FIG. 8 may be the base station belonging to the cellular communication system 140 of FIG. 1. The vehicle 1200 of FIG. 8 may be the vehicle 100 of FIG. 1, and the communication node 1300 of FIG. 8 may be the communication node located in vehicle 110 of FIG. 1, the communication node located in the infrastructure 120, or the communication node carried by the person 130. The V2X communication may be performed based on the side link TM 3 or TM 4. Also, the SPS scheme and/or the CA scheme may be applied to the V2X communication system. The data transmitted or received based on the SPS scheme may be referred to as "SPS traffic," and a carrier may be referred to as a "frequency band," a "BWP," a "V2X frequency band," or a "V2X frequency."

The vehicle 1200 may perform V2X communication with the communication node 1300 based on the SPS configuration set by the base station 1100 (S801). Here, the V2X communications may be performed using one or more carriers. The vehicle 1200 may measure channel states (e.g., CBRs) for the one or more carriers in which the V2X communication is performed (S802). Also, the vehicle 1200 may measure channel states of all the carriers configured for the vehicle as well as the one or more carriers in which the V2X communication is performed. That is, the vehicle may measure CBRs for all the aggregated carriers. The CBR measurement may be performed periodically or when a specific event (e.g., a request from the base station 1100) occurs. The vehicle 1200 may compare the measured CBR with a predetermined threshold and determine that an overload has occurred in the corresponding carrier if the measured CBR is equal to or greater than the predetermined threshold.

When an overload occurs in the carrier, the vehicle may determine at least one candidate carrier capable of load distribution (S803). The at least one candidate carrier may include a carrier that can be activated among the carriers aggregated with the carrier used in the step S801. For example, a carrier having a CBR below the predetermined threshold among the aggregated carriers may be determined as the candidate carrier. The vehicle 1200 may generate UE assistance information including a load distribution indicator, candidate carrier information (e.g., indexes of candidate carriers, the number of candidate carriers, etc.), and the like. The load distribution indicator may request load distribution using the at least one candidate carrier indicated by the UE assistance information.

The vehicle 1200 may transmit the UE assistance information including the load distribution indicator, the candidate carrier information, and the like to the base station 1100 (S804). Alternatively, sidelink UE information may be used in the step S804 instead of the UE assistance information. The UE assistance information or the sidelink UE information may be transmitted via a carrier (e.g., primary carrier between the base station 1100 and the vehicle 1200). The candidate carrier information included in the UE assistance information (or, sidelink UE information) may be information indicating a frequency band (e.g., BWP) available for transmission of the SPS traffic. For example, the candidate carrier information included in the UE assistance information (or, sidelink UE information) may indicate a set of frequency bands available for transmission of the SPS traffic (e.g., the set described in Table 3). Alternatively, the frequency bands available for transmission of the SPS traffic indicated by the UE assistance information may be represented in a bitmap form.

Meanwhile, the base station 1100 may receive the UE assistance information from the vehicle 1200, and identity that the load distribution using the at least one candidate carrier is requested based on the information (e.g., the load distribution indicator, the candidate carrier information) included in the UE assistance information.

When the SPS configuration of the at least one carrier used for V2X communications in the step S801 is equally applied to the at least one candidate carrier determined in the step S803, the base station 1100 may transmit to the vehicle 1200 an SPS configuration activation message indicating activation of the SPS configuration in the at least one candidate carrier without reconfiguring the SPS configuration. The SPS configuration activation message may indicate the index of the at least one candidate carrier for which the SPS configuration is activated. Here, the SPS configuration activation message may be an RRC signaling message.

The vehicle 1200 may receive the SPS configuration activation message from the base station 1100, and perform V2X communication with the communication node 1300 using the at least one anchor carrier (i.e., the at least one carrier used for V2X communications in the step S801) and the at least one candidate carrier (S807). Alternatively, the vehicle 1200 may perform V2X communication with the communication node using the at least one anchor carrier and the at least one candidate carrier without receiving the SPS configuration activation message after the transmission of the UE assistance information (S807).

Meanwhile, the SPS configuration (e.g., SPS parameters) may be changed based on the number of candidate carriers determined in the step S803. In this case, the base station 1100 may change the SPS configuration based on the number of candidate carriers (S805). For example, the base station 1100 may determine one or more frequency bands to which the SPS configuration is to be applied among the frequency bands (e.g., candidate carriers) indicated by the UE assistance information, and change the SPS configuration based on the determined one or more frequency bands. The step S805 may be performed based on the SPS configuration change scheme 1, 2 or 3 described in the embodiment of FIG. 7. In the embodiment of FIG. 7, the SPS configuration change scheme 1, 2 or 3 is performed by the vehicle 1200. However, in the embodiment of FIG. 8, the SPS configuration change scheme 1, 2 or 3 may be performed by the base station 1100 instead of the vehicle 1200. That is, the operation of the base station 1100 performing the SPS configuration change scheme 1, 2 or 3 in the embodiment of FIG. 8 may be the same as the operation of the vehicle 1200 performing the SPS configuration change scheme 1, 2 or 3 in the embodiment of FIG. 7.

When the step S805 is completed, the base station 1100 may generate an RRC connection reconfiguration message including the changed SPS configuration (e.g., changed SPS parameters). When the SPS configuration change scheme 1 is used, the RRC connection reconfiguration message may include the candidate carrier information (e.g., indexes of candidate carriers, the number of candidate carriers), the data transmission interval (N×T), the offset between data transmission intervals (T), and the like. When the SPS configuration change scheme 2 is used, the RRC connection reconfiguration message may include the candidate carrier information (e.g., indexes of candidate carriers, the number of candidate carriers), the data transmission interval (T), the offset between data transmission intervals (M), the size of data which can be transmitted in each carrier (i.e., the size of data is the same in all carriers), and the like. Here, the data size may be the same in the carriers.

When the SPS configuration change scheme 3 is used, the RRC connection reconfiguration message may include the candidate carrier information (e.g., indexes of candidate carriers, the number of candidate carriers), the data transmission interval (T), the offset between data transmission intervals (M), the size of data which can be transmitted in each carrier, and the like. Here, the size of data may be inversely proportional to the channel congestion of each carrier), and the like.

The base station 1100 may transmit the RRC connection reconfiguration message including the changed SPS configuration (e.g., changed SPS parameters) to the vehicle 1200 (S806). Alternatively, the changed SPS configuration (e.g., changed SPS parameters) may be transmitted to the vehicle 1200 through the SPS activation message (e.g., the SPS activation request message) instead of the RRC connection reconfiguration message. The vehicle 1200 may receive the RRC connection reconfiguration message from the base station 1100 and may identify the changed SPS configuration included in the RRC connection reconfiguration message. Accordingly, the vehicle 1200 may perform V2X communications with the communication node 1300 in the at least one anchor carrier and the at least one candidate carrier using the changed SPS configuration (S807).

Figure 9:
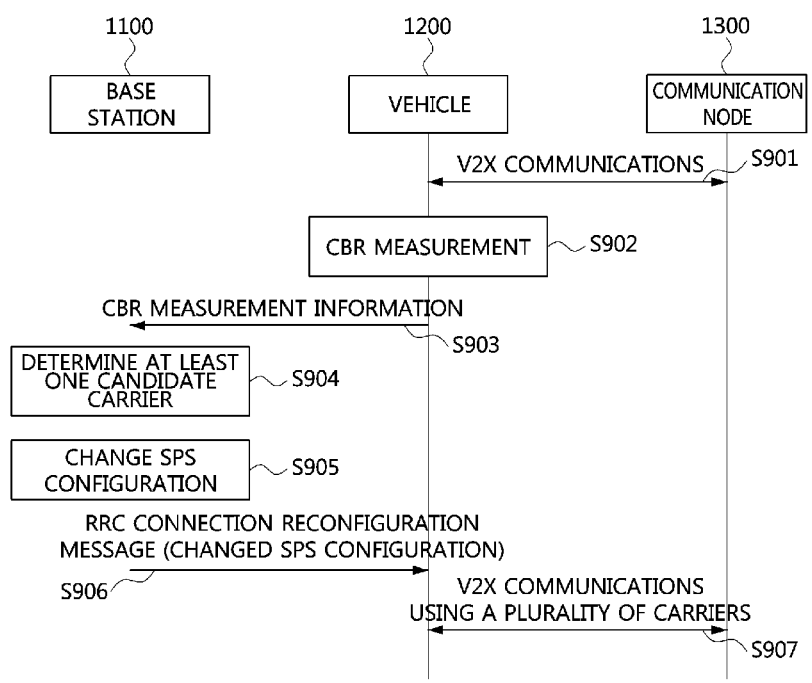
FIG. 9 is a sequence chart illustrating a third embodiment of a load distribution method using a plurality of carriers according to the present disclosure.

FIG. 9 is a sequence chart illustrating a third embodiment of a load distribution method using a plurality of carriers according to the present disclosure.

As shown in FIG. 9, a V2X communication system may include a base station 1100, a vehicle 1200 (e.g., a communication node located in a vehicle), a communication node 1300, and the like. For example, the base station 1100 of FIG. 9 may be the base station belonging to the cellular communication system 140 of FIG. 1. The vehicle 1200 of FIG. 9 may be the vehicle 100 of FIG. 1, and the communication node 1300 of FIG. 9 may be the communication node located in vehicle 110 of FIG. 1, the communication node located in the infrastructure 120, or the communication node carried by the person 130. The V2X communications may be performed based on the side link TM 3 or TM 4. Also, the SPS scheme and/or the CA scheme may be applied to the V2X communication system. The data transmitted or received based on the SPS scheme may be referred to as a "SPS traffic," and a carrier may be referred to as a "frequency band," a "BWP," a "V2X frequency band," or a "V2X frequency."

The vehicle 1200 may perform V2X communication with the communication node 1300 based on the SPS configuration set by the base station 1100 (S901). Here, the V2X communication may be performed using one or more carriers. The vehicle 1200 may measure channel states of all the carriers configured for the vehicle as well as the one or more carriers in which the V2X communication is performed (S902). That is, the vehicle 1200 may measure CBRs for all the aggregated carriers (e.g., all carriers to which the CA scheme is applied). The CBR measurement may be performed periodically or when a specific event (e.g., a request from the base station 1100) occurs.

The vehicle 1200 may transmit CBR measurement information (e.g., CBR for each carrier) to the base station 1100 (S903). The CBR measurement information may be transmitted via a carrier (e.g., primary carrier between the base station 1100 and the vehicle 1200). Also, the vehicle 1200 may transmit the candidate carrier information (e.g., indexes of candidate carriers, the number of candidate carriers) to the base station 1100 together with the CBR measurement information. The at least one candidate carrier may be determined by the vehicle 1200 based on the CBR. The at least one candidate carrier may include a carrier that can be activated (e.g., a carrier capable of load distribution) among the aggregated carriers. For example, the vehicle 1200 may determine a carrier having a CBR that is less than a predetermined threshold among the aggregated carriers as the candidate carrier.

The base station 1100 may receive the CBR measurement information from the vehicle 1200. When the candidate carrier information is not received from the vehicle 1200, the base station 1100 may determine at least one candidate carrier based on the CBR measurement information (S904). For example, the base station 1100 may determine at least one carrier having a CBR less than the predetermined threshold, which is indicated by the CBR measurement information, as the at least one candidate carrier.

When the SPS configuration of the at least one carrier used for V2X communications in the step S901 is equally applied to the at least one candidate carrier determined in the step S904, the base station 1100 may transmit to the vehicle 1200 an SPS configuration activation message indicating activation of the SPS configuration in the at least one candidate carrier, without reconfiguring the SPS configuration. The SPS configuration activation message may indicate the indexes of the candidate carriers for which the SPS configuration is activated. Here, the SPS configuration activation message may be an RRC signaling message.

The vehicle 1200 may receive the SPS configuration activation message from the base station 1100, and perform V2X communication with the communication node 1300 using the at least one anchor carrier (i.e., the at least one carrier used for V2X communications in the step S901) and the at least one candidate carrier (S907).

Meanwhile, the SPS configuration (e.g., SPS parameters) may be changed based on the number of candidate carriers determined in the step 904. In this case, the base station 1100 may change the SPS configuration based on the number of candidate carriers (S905). The step S905 may be performed based on the SPS configuration change scheme 1, 2 or 3 described in the embodiment of FIG. 7. In the embodiment of FIG. 7, the SPS configuration change scheme 1, 2 or 3 is performed by the vehicle 1200. However, in the embodiment of FIG. 9, the SPS configuration change scheme 1, 2 or 3 may be performed by the base station 1100 instead of the vehicle 1200. That is, the operation of the base station 1100 performing the SPS configuration change scheme 1, 2 or 3 in the embodiment of FIG. 9 may be the same as the operation of the vehicle 1200 performing the SPS configuration change scheme 1, 2 or 3 in the embodiment of FIG. 7.

When the step S905 is completed, the base station 1100 may generate an RRC connection reconfiguration message including the changed SPS configuration (e.g., changed SPS parameters). When the SPS configuration change scheme 1 is used, the RRC connection reconfiguration message may include the candidate carrier information (e.g., indexes of candidate carriers, the number of candidate carriers), the data transmission interval (N×T), the offset between data transmission intervals (T), and the like. When the SPS configuration change scheme 2 is used, the RRC connection reconfiguration message may include the candidate carrier information (e.g., indexes of candidate carriers, the number of candidate carriers), the data transmission interval (T), the offset between data transmission intervals (M), the size of data which can be transmitted in each carrier (i.e., the size of data is the same in all carriers), and the like. Here, the data size may be the same in the carriers. When the SPS configuration change scheme 3 is used, the RRC connection reconfiguration message may include the candidate carrier information (e.g., indexes of candidate carriers, the number of candidate carriers), the data transmission interval (T), the offset between data transmission intervals (M), the size of data which can be transmitted in each carrier, and the like. Here, the data size may be inversely proportional to the channel congestion in each of the carriers.

The base station 1100 may transmit the RRC connection reconfiguration message including the changed SPS configuration (e.g., changed SPS parameters) to the vehicle 1200 (S906). The vehicle 1200 may receive the RRC connection reconfiguration message from the base station 1100, and may identify the changed SPS configuration included in the RRC reconfiguration message. Accordingly, the vehicle 1200 may perform V2X communications with the communication node 1200 in the at least one anchor carrier and the at least one candidate carrier using the changed SPS configuration (S907).

Meanwhile, when the changed SPS configuration is applied to aggregated carriers (e.g., anchor carrier+candidate carrier) in the embodiments shown in FIGS. 7 to 9, the communication node 1300 may not know the changed SPS configuration. In this case, the V2X communication between the vehicle 1200 and the communication node 1300 may not be properly performed. In order to solve this problem, a signaling scheme for the changed SPS configuration may be additionally performed. For example, the changed SPS configuration may be transmitted based on one of the following signaling schemes.

Signaling scheme #1: The changed SPS configuration is transmitted to the communication node 1300 through an RRC message.

Signaling scheme #2: The changed SPS configuration is transmitted to the communication node 1300 through a combination of an RRC message and an SCI.

Signaling scheme #3: The changed SPS configuration is transmitted to the communication node 1300 through a combination of an RRC message and a MAC CE.

Signaling scheme #4: The changed SPS configuration is transmitted to the communication node 1300 through an SCI.

Signaling scheme #5: The changed SPS configuration is transmitted to the communication node 1300 through a MAC CE.

The signaling schemes #1 to #3 may be performed when the communication node 1300 is located within the cell coverage of the base station 1100. The signaling schemes #4 and #5 may be performed not only when the communication node 1300 is located within the cell coverage of the base station 1100 but also when the communication node 1300 is located outside the cell coverage of the base station 1100. The signaling scheme #1 of the changed SPS configuration may be performed as follows.

Figure 10:
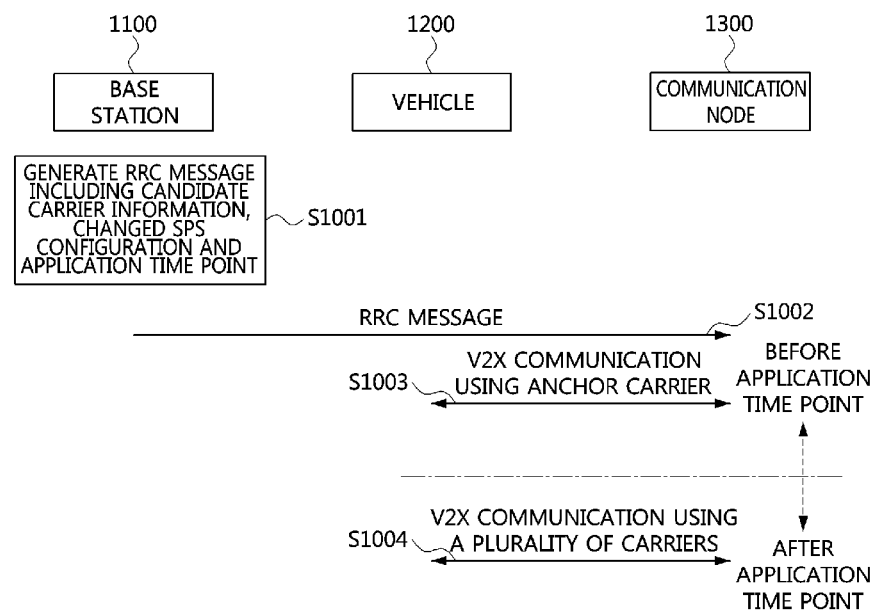
FIG. 10 is a sequence chart illustrating a first embodiment of a method for transmitting a changed SPS configuration in a V2X communication system.

FIG. 10 is a sequence chart illustrating a first embodiment of a method for transmitting a changed SPS configuration in a V2X communication system.

As shown in FIG. 10, a V2X communication system may include a base station 1100, a vehicle 1200 (e.g., a communication node located in a vehicle), a communication node 1300, and the like. For example, the base station 1100 of FIG. 10 may be the base station 1100 shown in FIGS. 7 to 9. The vehicle 1200 of FIG. 10 may be the vehicle 1200 shown in FIGS. 7 to 9. The communication node 1300 of FIG. 10 may be the communication node 1300 shown in FIGS. 7 to 9.

The embodiment shown in FIG. 10 may be performed after the SPS configuration is changed in the embodiments shown in FIGS. 7 to 9. For example, the embodiment shown in FIG. 10 may be performed after the step S704 in FIG. 7, after the step S805 in FIG. 8, or after the step S905 in FIG. 9.

The base station 1100 may generate an RRC message including at least one of candidate carrier information, changed SPS configuration, and application time point (S1001). The candidate carrier information may include one or more new candidate carriers other than the carrier (e.g., anchor carrier) used for the V2X communication (e.g., the V2X communication in the step S701, S801, or S901) between the vehicle 1200 and the communication node 1300. For example, the candidate carrier information may include at least one index of the at least one new carrier. Alternatively, the candidate carrier information may indicate a set of frequency bands as shown in Table 3. Alternatively, the candidate carrier information may include a bitmap indicating at least one available frequency band. Further, the candidate carrier information may include information indicating the number of new carriers.

The changed SPS configuration may include at least one of a data transmission interval, an offset between the data transmission intervals, and the size of data transmittable in each of the carriers. For example, when the SPS configuration change scheme #1 is used, the changed SPS configuration may include a data transmission interval (N×T) and an offset of the data transmission interval (T). When the SPS configuration change scheme #2 is used, the changed SPS configuration may include a data transmission interval (T), an offset of the data transmission interval (M), and the size of data transmittable in each of the carriers. When the SPS configuration change scheme #3 is used, the changed SPS configuration may include a data transmission interval (T), an offset of the data transmission interval (M), and the size of data transmittable in each of the carriers.

The application time point may indicate when the changed SPS configuration is to be applied to the aggregated carriers including the anchor carrier and the at least one carrier indicated by the candidate carrier information. For example, the application time point may indicate an offset between a reception time (or, transmission time) of the RRC message and a time point at which the changed SPS configuration is to be applied.

The base station 1100 may transmit an RRC message including at least one of the candidate carrier information, the changed SPS configuration, and the application time point to the communication node 1300 (S1002). The communication node 1300 may receive the RRC message from the base station 1100, and may identify the candidate carrier information, the changed SPS configuration, and the application time point which are included in the RRC message. Accordingly, before the application time point indicated by the RRC message, the communication node 1300 may perform V2X communication with the vehicle 1200 using the existing anchor carrier (S1003). Also, after the application time point indicated by the RRC message, the communication node 1300 may perform V2X communication with the vehicle 1200 using the aggregated carriers including the anchor carrier and the at least one carrier indicated by the RRC message (S1004). Further, in the step S1004, the communication node 1300 may perform V2X communication based on the changed SPS configuration included in the RRC message.

Meanwhile, the signaling schemes #2 and #3 of the changed SPS configuration may be performed as follows.

Figure 11:
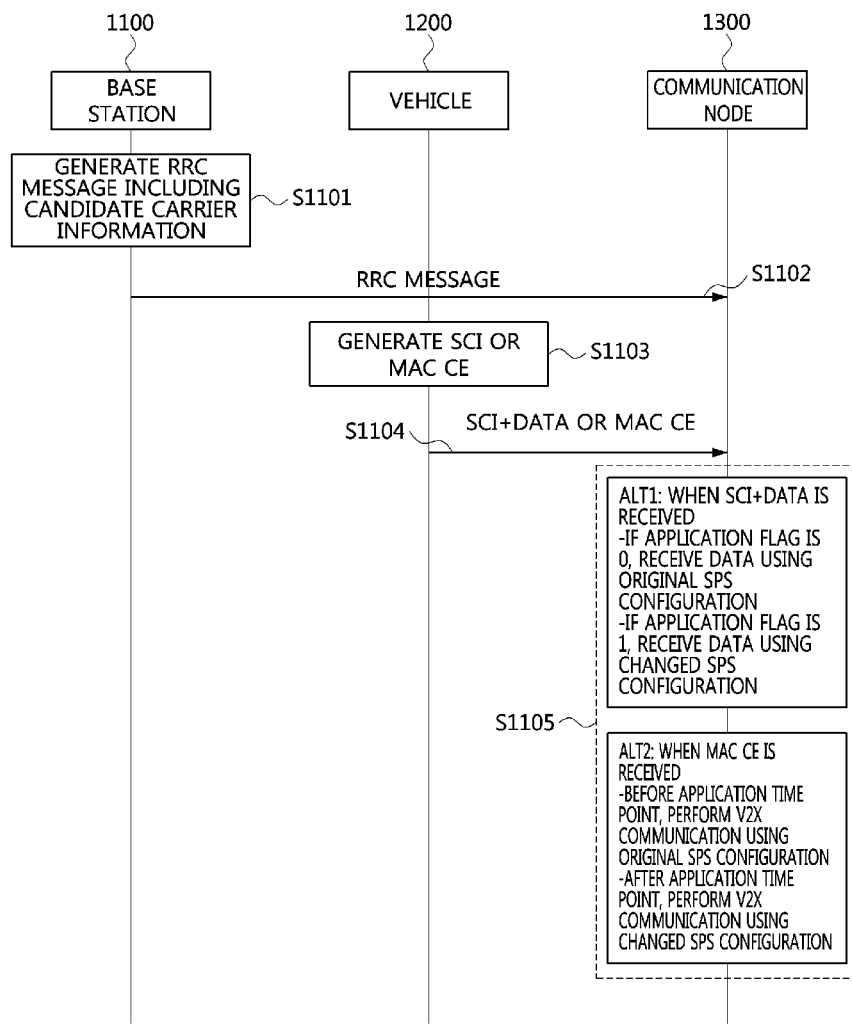
FIG. 11 is a sequence chart illustrating a second embodiment of a method for transmitting a changed SPS configuration in a V2X communication system.

FIG. 11 is a sequence chart illustrating a second embodiment of a method for transmitting a changed SPS configuration in a V2X communication system.

As shown in FIG. 11, a V2X communication system may include a base station 1100, a vehicle 1200 (i.e., a communication node located in a vehicle), a communication node 1300, and the like. For example, the base station 1100 of FIG. 11 may be the base station 1100 shown in FIGS. 7 to 9. The vehicle 1200 of FIG. 11 may be the vehicle 1200 shown in FIGS. 7 to 9. The communication node 1300 of FIG. 11 may be the communication node 1300 shown in FIGS. 7 to 9.

The embodiment shown in FIG. 11 may be performed after the SPS configuration is changed in the embodiments shown in FIGS. 7 to 9. For example, the embodiment shown in FIG. 11 may be performed after the step S704 in FIG. 7, after the step S805 in FIG. 8, or after the step S905 in FIG. 9.

The base station 1100 may generate an RRC message including candidate carrier information (S1101). The candidate carrier information may include one or more new candidate carriers other than the carrier (e.g., anchor carrier) used for the V2X communication between the vehicle 1200 and the communication node 1300 (e.g., the V2X communication in the step S701, S801, or S901). For example, the candidate carrier information may include at least one index of the at least one new carrier. Alternatively, the candidate carrier information may indicate a set of frequency bands as shown in Table 3. Alternatively, the candidate carrier information may include a bitmap indicating at least one available frequency band. Further, the candidate carrier information may include information indicating the number of the new carriers.

The base station 1100 may transmit an RRC message including the candidate carrier information to the communication node 1300 (S1102). The communication node 1300 may receive the RRC message from the base station 1100, and may identify the candidate carrier information included in the RRC message. In this case, the communication node 1300 may determine that the at least one carrier indicated by the candidate carrier information can be aggregated with the anchor carrier (e.g., the carrier used for the V2X communication in the step S701, S801, or S901).

When the signaling scheme #2 is used, the vehicle 1200 may generate an SCI including information elements (IEs) of Table 4 below (S1103). Here, a SCI format 1 may be used. Alternatively, a new SCI format including the changed SPS configuration and an application flag may be defined, and the vehicle may use the new SCI format to inform the communication node of the changed SPS configuration.

TABLE 4

| IE | Description |
| --- | --- |
| MCS | Modulation and Coding Scheme (MCS) used for V2X communications |
| Priority | Priority of Transport Block (TB), which is configured by a higher layer signaling |
| Time Gap | Time gap between initial transmission and retransmission Frequency resource positions of initial transmission and retransmission |
| Resource reservation interval | Resource reservation interval in V2X communications |
| Changed SPS configuration | Candidate carrier information (indexes and the number of candidate carriers) Data transmission interval Offset between data transmission intervals Size of data which can be transmitted in each carrier |
| Application flag | Information indicating a time point at which the changed SPS configuration is applied |

When the SPS configuration change scheme #1 is used, the changed SPS configuration may include a data transmission interval (N×T) and an offset of the data transmission interval (T). When the SPS configuration change scheme #2 is used, the changed SPS configuration may include a data transmission interval (T), an offset of the data transmission interval (M), and the size of data transmittable in each of the carriers. When the SPS configuration change scheme #3 is used, the changed SPS configuration may include a data transmission interval (T), an offset of the data transmission interval (M), and the size of data transmittable in each of the carriers.

The application flag may be set to 0 or 1. The application flag set to 0 may indicate that the changed SPS configuration indicated by the SCI is applied after transmission of the corresponding SCI. The application flag set to 1 may indicate that the changed SPS configuration indicated by the SCI is applied from transmission of the corresponding SCI.

The vehicle may transmit the SCI (or, SCI+data) to the communication node. The communication node may receive the SCI from the vehicle, identify the changed SPS configuration included in the SCI, and identify a time point at which the changed SPS configuration is applied based on the application flag included in the SCI.

For example, when 'SCI+data' is received and the application flag included in the SCI is set to 0, the communication node 1300 may perform a reception operation for the corresponding data by using an original SPS configuration (e.g., the SPS configuration used for the V2X communication in the step S701, S801, or S901) (S1105). Alternatively, when 'SCI+data' is received and the application flag included in the SCI is set to 1, the communication node 1300 may perform a reception operation on the corresponding data by using the changed SPS configuration included in the corresponding SCI (S1105). Here, the changed SPS configuration may be applied to the anchor carrier and the at least one carrier indicated by the RRC message.

When the signaling scheme #3 is used, the vehicle 1200 may generate a MAC CE including the changed SPS configuration and an application time point (S1103). The changed SPS configuration may include at least one of a data transmission interval, an offset of the data transmission interval, and a size of data transmittable in each of the carriers. The application time point may indicate when the changed SPS configuration is to be applied to the aggregated carriers including the anchor carrier and the at least one carrier indicated by the candidate carrier information. For example, the application time point may indicate an offset between a reception time point (or, transmission time point) of the MAC CE and a time point at which the changed SPS configuration is to be applied.

The vehicle 1200 may transmit the MAC CE including the changed SPS configuration and the application time point to the communication node 1300 (S1104). The communication node 1300 may receive the MAC CE from the vehicle 1200, and may identify the changed SPS configuration and the application time point which are included in the MAC CE. Accordingly, before the application time point indicated by the MAC CE, the communication node 1300 may perform V2X communication with the vehicle 1200 using the existing anchor carrier (S1003). Also, after the application time point indicated by the MAC CE, the communication node 1300 may perform V2X communication with the vehicle 1200 using the aggregated carriers including the anchor carrier and the at least one carrier indicated by the RRC message (S1105). Further, in the step S1105, the communication node 1300 may perform V2X communication based on the changed SPS configuration included in the MAC CE.

Meanwhile, the signaling schemes #4 and #5 of the changed SPS configuration may be performed as follows.

Figure 12:
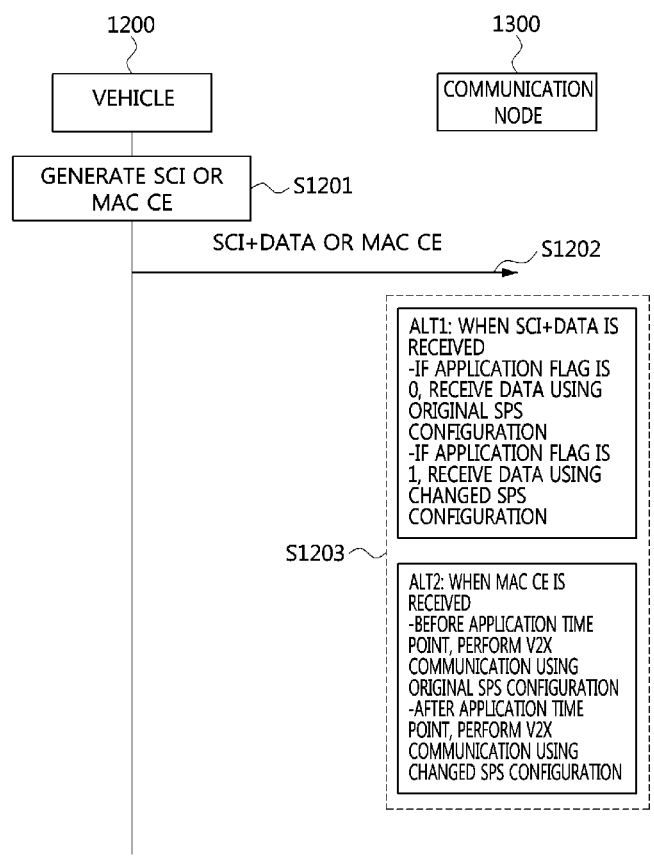
FIG. 12 is a sequence chart illustrating a third embodiment of a method for transmitting a changed SPS configuration in a V2X communication system.

FIG. 12 is a sequence chart illustrating a third embodiment of a method for transmitting a changed SPS configuration in a V2X communication system.

As shown in FIG. 12, a V2X communication system may include a base station (not shown), a vehicle 1200 (i.e., a communication node located in a vehicle), a communication node 1300, and the like. The vehicle 1200 of FIG. 12 may be the vehicle 1200 shown in FIGS. 7 to 9. The communication node 1300 of FIG. 12 may be the communication node 1300 shown in FIGS. 7 to 9.

The embodiment shown in FIG. 12 may be performed after the SPS configuration is changed in the embodiments shown in FIGS. 7 to 9. For example, the embodiment shown in FIG. 12 may be performed after the step S704 in FIG. 7, after the step S805 in FIG. 8, or after the step S905 in FIG. 9.

When the signaling scheme #4 is used, the vehicle 1200 may generate an SCI including IEs of Table 5 below (S1201). Here, the SCI format 1 may be used. Alternatively, a new SCI format including the candidate carrier information, the changed SPS configuration and the application flag may be defined, and the vehicle may use the new SCI format to inform the communication node of the changed SPS configuration.

TABLE 5

| IE | Description |
|---|---|
| MCS | Modulation and Coding Scheme (MCS) used for V2X communications |
| Priority | Priority of Transport Block (TB), which is configured by a higher layer signaling |
| Time Gap | Time gap between initial transmission and retransmission Frequency resource positions of initial transmission and retransmission |
| Resource reservation interval | Resource reservation interval in V2X communications |
| Candidate carrier information | Indexes of candidate carriers The number of candidate carriers |
| Changed SPS configuration | Data transmission interval Offset between data transmission intervals Size of data which can be transmitted in each carrier |
| Application flag | Information indicating a time point at which the changed SPS configuration is applied |

The candidate carrier information may indicate one or more new candidate carriers other than the carrier (e.g., anchor carrier) used for the V2X communication between the vehicle 1200 and the communication node 1300 (e.g., the V2X communication in the step S701, S801, or S901). For example, the candidate carrier information may include at least one index of the at least one new carrier. Alternatively, the candidate carrier information may indicate a set of frequency bands as shown in Table 3. Alternatively, the candidate carrier information may include a bitmap indicating at least one available frequency band. Further, the candidate carrier information may include information indicating the number of the new carriers.

When the SPS configuration change scheme #1 is used, the changed SPS configuration may include a data transmission interval (N×T) and an offset of the data transmission interval (T). When the SPS configuration change scheme #2 is used, the changed SPS configuration may include a data transmission interval (T), an offset of the data transmission interval (M), and the size of data transmittable in each of the carriers. When the SPS configuration change scheme #3 is used, the changed SPS configuration may include a data transmission interval (T), an offset of the data transmission interval (M), and the size of data transmittable in each of the carriers.

The application flag may be set to 0 or 1. The application flag set to 0 may indicate that the changed SPS configuration indicated by the SCI is applied after transmission of the corresponding SCI. The application flag set to 1 may indicate that the changed SPS configuration indicated by the SCI is applied from transmission of the corresponding SCI.

The vehicle 1200 may transmit the SCI (or, SCI+data) to the communication node 1300 (S1202). The communication node 1300 may receive the SCI from the vehicle 1200, and identify the candidate carrier information, the changed SPS configuration, and the application flag which are included in the SCI. Also, the communication node 1300 may identify a time point at which the changed SPS configuration is to be applied based on the application flag included in the SCI.

For example, when 'SCI+data' is received and the application flag included in the SCI is set to 0, the communication node 1300 may perform a reception operation for the corresponding data by using an original SPS configuration (e.g., the SPS configuration used for the V2X communication in the step S701, S801, or S901) (S1203). Alternatively, when 'SCI+data' is received and the application flag included in the SCI is set to 1, the communication node 1300 may perform a reception operation on the corresponding data by using the changed SPS configuration included in the corresponding SCI (S1203). Here, the changed SPS configuration may be applied to the aggregated carriers including the anchor carrier and the at least one carrier indicated by the RRC message.

When the signaling scheme #5 is used, the vehicle 1200 may generate a MAC CE including the candidate carrier information, the changed SPS configuration and an application time point (S1201). The candidate carrier information may indicate one or more new candidate carriers other than the carrier (e.g., anchor carrier) used for the V2X communication between the vehicle 1200 and the communication node 1300 (e.g., the V2X communication in the step S701, S801, or S901). For example, the candidate carrier information may include at least one index of the at least one new carrier. Further, the candidate carrier information may include information indicating the number of new carriers.

The changed SPS configuration may include at least one of a data transmission interval, an offset of the data transmission interval, and a size of data transmittable in each of the carriers. The application time point may indicate when the changed SPS configuration is to be applied to the aggregated carriers including the anchor carrier and the at least one carrier indicated by the candidate carrier information. For example, the application time point may indicate an offset between a reception time point (or, transmission time point) of the MAC CE and a time point at which the changed SPS configuration is to be applied.

The vehicle 1200 may transmit the MAC CE including the candidate carrier information, the changed SPS configuration and the application time point to the communication node 1300 (S1202). The communication node 1300 may receive the MAC CE from the vehicle 1200, and may identify the candidate carrier information, the changed SPS configuration and the application time point which are included in the MAC CE. Accordingly, before the application time point indicated by the MAC CE, the communication node 1300 may perform V2X communication with the vehicle 1200 using the existing anchor carrier (S1203). Also, after the application time point indicated by the MAC CE, the communication node 1300 may perform V2X communication with the vehicle 1200 using the aggregated carriers including the anchor carrier and the at least one carrier indicated by the MAC CE (S1203). Further, in the step S1203, the communication node 1300 may perform V2X communication based on the changed SPS configuration included in the MAC CE.

Meanwhile, while the V2X communication between the vehicle 1200 and the communication node 1300 is performed using the aggregated carriers according to the embodiments described above, deactivation of one or more carriers among the aggregated carriers may be required according to a channel state between the vehicle 1200 and the communication node 1300.

For example, when the aggregated carriers are 'carrier #1+carrier #2', and a CBR measured in the carrier #2 is greater than or equal to a preconfigured threshold, deactivation of the carrier #2 may be required. Alternatively, even when the aggregated carriers are 'carrier #1+carrier #2', if it is determined that the requirements of the V2X communication (e.g., low-latency requirements) are satisfied by using only the carrier #1, deactivation of the carrier #2 may be required. Alternatively, when the aggregated carriers are 'carrier #1+carrier #2' and transmission of Ultra-Reliable and Low-Latency Communication (URLLC) data is needed in the carrier #1, deactivation of the carrier #1 may be required. The URLLC data may be data transmitted according to the requirements of the URLLC service. A method for deactivating a carrier may be performed as follows.

Figure 13:
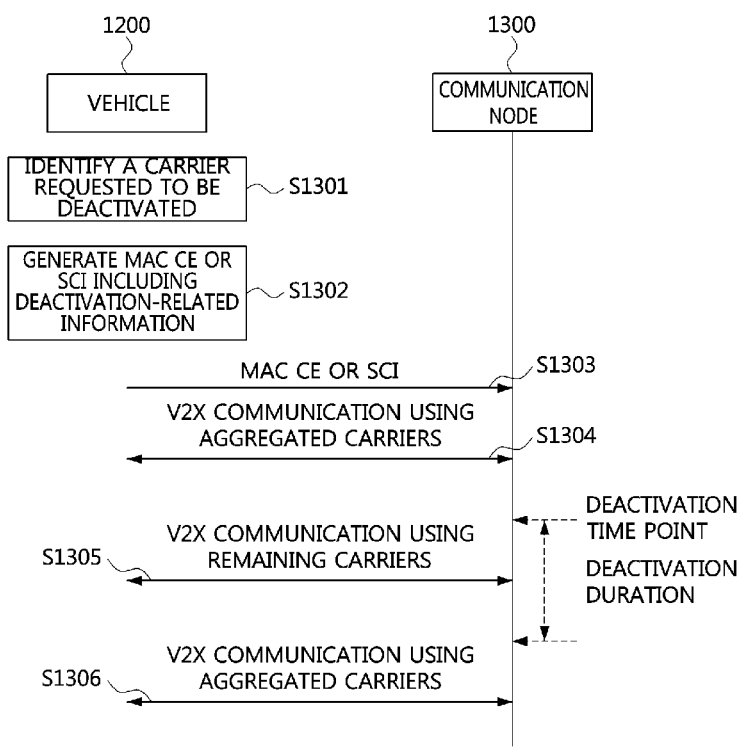
FIG. 13 is a sequence chart illustrating a first embodiment of a method for deactivating a carrier in a V2X communication system.

FIG. 13 is a sequence chart illustrating a first embodiment of a method for deactivating a carrier in a V2X communication system.

As shown in FIG. 13, a V2X communication system may include a base station (not shown), a vehicle 1200 (i.e., a communication node located in a vehicle), a communication node 1300, and the like. The vehicle 1200 of FIG. 13 may be the vehicle 1200 shown in FIGS. 10 to 12. The communication node 1300 of FIG. 13 may be the communication node 1300 shown in FIGS. 10 to 12.

The embodiment shown in FIG. 13 may be performed after the SPS configuration is changed in the embodiments shown in FIGS. 10 to 12. For example, the embodiment shown in FIG. 13 may be performed after the step S1004 in FIG. 10, after the step S1105 in FIG. 11, or after the step S1203 in FIG. 12.

The vehicle 1200 may identify one or more carriers for which deactivation is required among the aggregated carriers (S1301). For example, the vehicle 1200 may determine that the deactivation of the corresponding carrier is required when one of the following conditions is satisfied.

Condition #1: A case that a CBR measured in the carrier is greater than or equal to a preconfigured threshold.

Condition #2: A case that the requirements of the V2X communication are satisfied even when only one carrier is used.

Condition #3: A case that transmission of low-latency data (e.g., URLLC data) is required in the carrier.

When there is a carrier (hereinafter referred to as a "deactivation carrier") deactivation of which is required, the vehicle 1200 may generate a MAC CE or an SCI including at least one of a deactivation indicator, an index of the deactivation carrier, a deactivation time point, a deactivation duration, and an SPS configuration indicator (S1302).

The deactivation indicator may have a size of 1 bit. For example, the deactivation indicator set to 0 may indicate that deactivation of the carrier is not required. The deactivation indicator set to 1 may indicate that deactivation of the carrier is required. The index of the deactivation carrier may be the index of the carrier deactivation of which is required among the aggregated carriers used for the V2X communication between the vehicle 1200 and the communication node 1300.

The deactivation time point may indicate when the carrier is to be deactivated. For example, the deactivation time point may be an offset between a reception time point (or transmission time point) of the MAC CE or the SCI and a time point at which the carrier is to be deactivated. The deactivation duration may indicate an interval for which the carrier is deactivated. The deactivation duration may start from the deactivation time point. When the deactivation duration ends, the deactivation carrier may be reactivated.

The SPS configuration indicator may indicate an SPS configuration to be applied to the remaining carriers (i.e., active carriers) in the deactivation duration. The SPS configuration indicator may have a size of 1 bit. For example, the SPS configuration indicator set to 0 may indicate that the original SPS configuration used in the step S701, S801, or S901 is to be applied to the remaining carriers (e.g., active carriers) in the deactivation duration. The SPS configuration indicator set to 1 may indicate that the SPS configuration (e.g., the changed SPS configuration) used in the step S707, S807, or S907 is to be applied to the remaining carriers (e.g., active carriers) in the deactivation duration.

The vehicle 1200 may transmit to the communication node 1300 the MAC CE or the SCI including at least one of the deactivation indicator, the index of the deactivation carrier, the deactivation time point, the deactivation duration, and the SPS configuration indicator (S1303). The communication node 1300 may receive the MAC CE or the SCI, and identify the deactivation indicator, the index of the deactivation carrier, the deactivation time point, the deactivation duration, and the SPS configuration indicator.

Thus, before the deactivation time point, the V2X communication between the vehicle 1200 and the communication node 1300 may be performed using the aggregated carriers (S1304). In the deactivation duration, the V2X communication between the vehicle 1200 and the communication node 1300 may be performed using the remaining carrier(s) except the deactivation carrier (e.g., the carrier indicated by the index of the deactivation carrier) among the aggregated carriers (S1305). Here, the SPS configuration applied to the remaining carrier(s) may be determined by the SPS configuration indicator. After the deactivation duration, the V2X communication between the vehicle 1200 and the communication node 1300 may be performed using the aggregated carriers (S1306).

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a first terminal in a vehicle-to-everything (V2X) communication system, the operation method comprising:
    performing V2X communication with a second terminal in a first carrier based on an original semi-persistent scheduling (SPS) configuration applying to the first carrier;
    receiving sidelink control information (SCI) from the second terminal, the SCI including a changed SPS configuration to be applied to aggregated carriers including the first carrier and a second carrier, the changed SPS configuration including first information elements for the first carrier and second information elements for the second carrier which is configured to be different from the first carrier in a frequency domain;
    performing the V2X communication with the second terminal in the first carrier based on the first information elements included in the changed SPS configuration; and
    performing the V2X communication with the second terminal in the second carrier based on the second information elements included in the changed SPS configuration.

2. The operation method according to claim 1, wherein the first information elements includes at least one of a first data transmission interval in the first carrier, an offset between the first data transmission interval and a second data transmission interval in the second carrier, and a size of data transmittable in the first carrier, and the second information elements include at least one of the second data transmission interval in the second carrier, the offset between the first data transmission interval and the second data transmission interval, and a size of data transmittable in the second carrier.

3. The operation method according to claim 1, wherein the SCI further includes at least one index of at least one remaining carrier excluding the first carrier among the aggregated carriers.

4. The operation method according to claim 1, wherein the SCI further includes a flag indicating an application time point of the changed SPS configuration.

5. The operation method according to claim 4, further comprising:
    receiving data together with the SCI in a same slot or a same subframe from the second terminal,
    wherein the receiving operation for the data is performed according to the original SPS configuration when the flag included in the SCI is set to a first value.

6. The operation method according to claim 4, further comprising:
    receiving data together with the SCI in a same slot or a same subframe from the second terminal,
    wherein the receiving operation for the data is performed according to the changed SPS configuration when the flag included in the SCI is set to a second value.

7. The operation method according to claim 1, further comprising:
    receiving a medium access control (MAC) control element (CE) from the second terminal, the MAC CE including deactivation-related information; and
    performing the V2X communication with the second terminal using at least one remaining carrier excluding one or more carriers indicated by the deactivation-related information among the aggregated carriers.

8. The operation method according to claim 7, wherein the deactivation-related information includes at least one of a deactivation indicator, at least one index of the one or more carriers, a deactivation time point, a deactivation duration, and an SPS configuration indicator.

9. The operation method according to claim 8, wherein the one or more carriers are activated after the deactivation duration.

10. The operation method according to claim 8, wherein the SPS configuration indicator indicates whether the original SPS configuration or the changed SPS configuration is applied to the at least one remaining carrier.

11. An operation method of a first terminal in a vehicle-to-everything (V2X) communication system, the operation method comprising:
performing V2X communication with a second terminal in a first carrier based on an original semi-persistent scheduling (SPS) configuration applying to the first carrier;
receiving from a base station a radio resource control (RRC) message including a changed SPS configuration to be applied to aggregated carriers including the first carrier and a second carrier, the changed SPS configuration including first information elements for the first carrier and second information elements for the second carrier which is configured to be different from the first carrier in a frequency domain; and
performing the V2X communication with the second terminal in the first carrier based on the first information elements included in the changed SPS configuration; and
performing the V2X communication with the second terminal in the second carrier based on the second information elements included in the changed SPS configuration.

12. The operation method according to claim 11, wherein the first information elements include at least one of a first data transmission interval in the first carrier, an offset between the first data transmission interval and a second data transmission interval in the second carrier, and a size of data transmittable in the first carrier, and the second information elements include at least one of the second data transmission interval in the second carrier, the offset between the first data transmission interval and the second data transmission interval, and a size of data transmittable in the second carrier.

13. The operation method according to claim 11, wherein the RRC message further includes at least one index of at least one remaining carrier excluding the first carrier among the aggregated carriers.

14. The operation method according to claim 11, wherein the RRC message further includes information indicating an application time point of the changed SPS configuration, the V2X communication between the first terminal and the second terminal is performed using the first carrier before the application time point, and the V2X communication between the first terminal and the second terminal is performed using the aggregated carriers after the application time point.

15. An operation method of a first terminal in a vehicle-to-everything (V2X) communication system, the operation method comprising:
performing V2X communication with a second terminal in a first carrier based on an original semi-persistent scheduling (SPS) configuration applying to the first carrier;
receiving from a base station a radio resource control (RRC) message including information characterizing a second carrier to be aggregated with the first carrier;
receiving sidelink control information (SCI) from the second terminal, the SCI including a changed SPS configuration to be applied to aggregated carriers including the first carrier and the second carrier, the changed SPS configuration including first information elements for the first carrier and second information elements for the second carrier which is configured to be different from the first carrier in a frequency domain; and
performing the V2X communication with the second terminal based in the first carrier based on the first information elements included in the changed SPS configuration; and
performing the V2X communication with the second terminal in the second carrier based on the second information elements included in the changed SPS configuration.

16. The operation method according to claim 15, wherein the first information elements include at least one of a first data transmission interval in the first carrier, an offset between the first data transmission interval and a second data transmission interval in the second carrier, and a size of data transmittable in the first carrier, and the second information elements include at least one of the second data transmission interval in the second carrier, the offset between the first data transmission interval and the second data transmission interval, and a size of data transmittable in the second carrier.

17. The operation method according to claim 15, wherein the SCI further includes a flag indicating an application time point of the changed SPS configuration.

18. The operation method according to claim 15, further comprising:
receiving a medium access control (MAC) control element (CE) from the second terminal, the MAC CE including deactivation-related information; and
performing the V2X communication with the second terminal using remaining carriers excluding one or more carriers indicated by the deactivation-related information among the aggregated carriers.

19. The operation method according to claim 18, wherein the deactivation-related information includes at least one of a deactivation indicator, an index of the one or more carriers, a deactivation time point, a deactivation duration, and an SPS configuration indicator.

20. The operation method according to claim 19, wherein the SPS configuration indicator indicates whether the original SPS configuration or the changed SPS configuration is applied to the remaining carriers.

\* \* \* \* \*